(12) United States Patent
Yashar et al.

(10) Patent No.: US 9,383,529 B1
(45) Date of Patent: Jul. 5, 2016

(54) OPTICAL COMMUNICATIONS MODULE INCORPORATING A DEFORMABLE CONSTRAINING MEMBER FOR CONSTRAINING AN OPTICAL RECEPTACLE

(71) Applicant: Avago Technologies General IP (Singapore) Pte. Ltd., Singapore (SG)

(72) Inventors: Frank Yashar, Cupertino, CA (US); David Meadowcroft, San Jose, CA (US); Paul Yu, Sunnyvale, CA (US); Robert Ritter, Los Altos, CA (US); Chaitanya G Arekar, Dublin, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/928,706

(22) Filed: Oct. 30, 2015

(51) Int. Cl.
*G02B 6/36* (2006.01)
*G02B 6/42* (2006.01)
*G02B 6/43* (2006.01)

(52) U.S. Cl.
CPC .............. *G02B 6/423* (2013.01); *G02B 6/4292* (2013.01); *G02B 6/43* (2013.01)

(58) Field of Classification Search
CPC ......... G02B 6/43; G02B 6/423; G02B 6/4292
USPC ......................................... 385/65, 83, 89, 92
See application file for complete search history.

(56) References Cited

U.S. PATENT DOCUMENTS

| 5,242,315 A * | 9/1993 | O'Dea | G02B 6/3817 385/59 |
| 5,323,481 A * | 6/1994 | Tokumaru | G02B 6/2551 385/136 |
| 7,559,704 B2 | 7/2009 | Togami | |
| 8,500,342 B2 | 8/2013 | Yu | |
| 2007/0237466 A1 * | 10/2007 | Togami | G02B 6/4219 385/92 |

* cited by examiner

*Primary Examiner* — Ryan Lepisto
*Assistant Examiner* — Eric Chiem

(57) ABSTRACT

An optical communications module includes a housing that accommodates at least one optical receptacle having a cylindrical connector portion. The module further includes at least one deformable constraining member made of a material having a Young's modulus that allows the deformable constraining member to take on an initial deformity upon application of a compression force, but permits only a partial reversal of the deformity upon reduction or removal of the compression force. The initial deformity is created when the deformable constraining member is pressed against the cylindrical connector portion during assembly of the module. The initial deformity includes a deformed contour portion that conforms to at least a part of the cylindrical connector portion of the optical receptacle and prevents wiggling of the cylindrical connector portion after the cylindrical connector portion is pushed during assembly into an alignment notch provided in a lower housing portion of the module.

20 Claims, 8 Drawing Sheets

OPTICAL COMMUNICATIONS MODULE INCORPORATING A DEFORMABLE CONSTRAINING MEMBER FOR CONSTRAINING AN OPTICAL RECEPTACLE

FIELD OF THE INVENTION

The invention relates to an optical communications module, and more particularly, to an optical communications module having one or more elements for holding an optical receptacle in place.

BACKGROUND

In an optical communication system, it is generally desirable to connect a fiber optic cable to an optoelectronic device such as an optoelectronic transmitter, an optoelectronic receiver, or an optoelectronic transceiver device; and in turn, to connect the optoelectronic device to an electronic system such as a switching system. Such operations can be facilitated by modularizing the optoelectronic device so as to enclose various optical components and electronic components into an optical communications module. While enclosing the electronic components into an optical communications module is a fairly straightforward process, several special precautions need to be taken with respect to optical components. For example, it is important to ensure that minimal optical path loss occurs between an optical component (such as a laser device or a photodetector) and an optical connector that provides external connectivity to the optical component. It is also important to ensure that minimal optical path loss occurs between the optical connector of the optical communications module and a connector portion of a fiber optic cable when the fiber optic cable is coupled to the optical connector.

Optical path loss can occur due to a variety of reasons, such as, for example, attenuation inside an optical element or attenuation as a result of misalignment between two optical components. Among the various types of misalignments that can occur, one type pertains to an optical misalignment between an optical connector of a fiber optic cable and a connector of the optical communications module when the fiber optic cable is connected to the optical communications module. Such misalignment can occur due to various reasons such as, for example, due to manufacturing problems or due to excessive and undesirable play when either the fiber optic cable or the optical communications module is moved after the fiber optic cable is connected to the optical communications module. It is very desirable to minimize optical misalignment and obtain tolerances of the order of +/−0.050 mm or better.

Traditional solutions for addressing some misalignment issues includes the use of various retainers such as clips and springs that use a resilient action to apply pressure against the optical connector and prevent movement of the optical connector inside the optical communications module. However, the resilient action of such elements fails to prevent counteractive forces that can occur during the process of inserting a fiber optic cable into the optical connector or when inadvertently flexing the fiber optic cable after coupling to the optical connector. Consequently, an alternative approach uses an epoxy to bind the optical connector to a housing portion of the optical communications module. While the epoxy based approach can feasibly provide good anchoring and alignment of the optical connector, the nature of such adhesives prevents, or hampers, removal and reinstalling of the optical connector if such operations are needed later on, such as, for example, when carrying out an active optical alignment procedure of the optical connector after manufacture or when carrying out repairs on a defective optical communications module.

It is therefore desirable to address at least some of the traditional shortcomings described above.

BRIEF DESCRIPTION OF THE FIGURES

Many aspects of the invention can be better understood by referring to the following description in conjunction with the accompanying claims and figures. Like numerals indicate like structural elements and features in the various figures. For clarity, not every element may be labeled with numerals in every figure. The drawings are not necessarily drawn to scale, emphasis instead being placed upon illustrating the principles of the invention. The drawings should not be interpreted as limiting the scope of the invention to the example embodiments shown herein.

DETAILED DESCRIPTION

Figure 1:
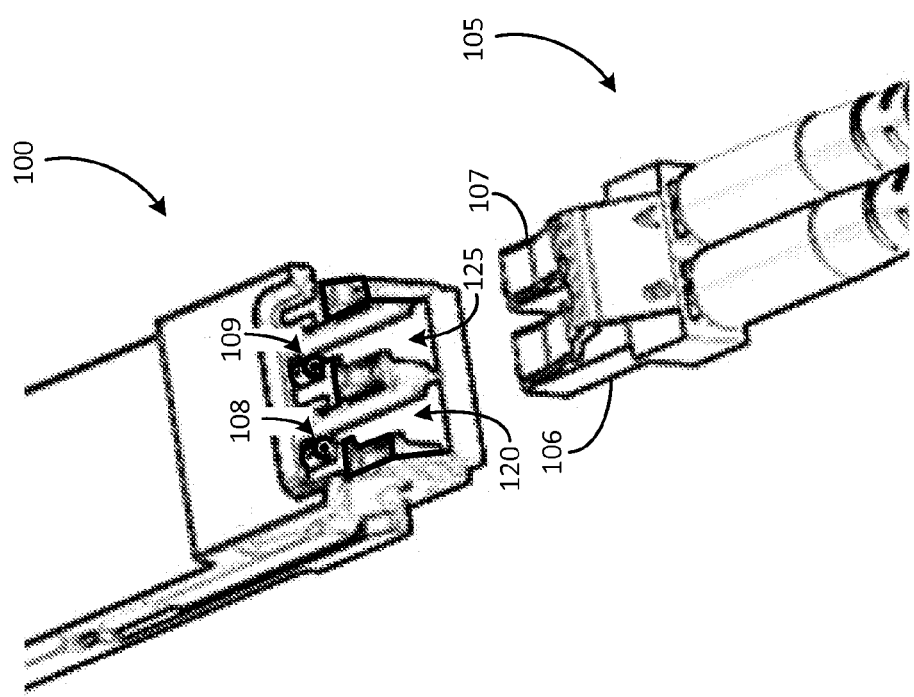
FIG. 1 shows an exemplary embodiment of an optical communications module in accordance with the disclosure, the optical communications module configured to accommodate a pair of connectors that are provided at an end of a fiber optic cable.

Throughout this description, embodiments and variations are described for the purpose of illustrating uses and implementations of inventive concepts. The illustrative description should be understood as presenting examples of inventive concepts, rather than as limiting the scope of the concept as disclosed herein. It should also be understood that the word "example" as used herein is intended to be non-exclusionary and non-limiting in nature. More particularly, the word "exemplary" as used herein indicates one among several examples and it must be understood that no undue emphasis or preference is being directed to the particular example being described. It should be further understood that certain words and terms are used herein solely for convenience and such words and terms should be interpreted as referring to various objects and actions that are generally understood in various forms and equivalencies by persons of ordinary skill in the art. For example, it should be understood that words indicative of surfaces, such as "top," "bottom," "upper," and "lower" can be used herein as a matter of convenience for describing certain features and actions. However, one of ordinary skill in the art will recognize that a "bottom" surface when an object is oriented in one way can become a "top" surface when the object is oriented in an opposite way. Also, it should be understood that the phrase "optical receptacle" as used herein generally refers to a connector portion of an optical communications module. The connector portion can be used for mating with various external components such as, for example, an optical connector disposed at the end of a fiber optic cable. Furthermore, the word "receptacle" in the phrase "optical receptacle" should not be interpreted as exclusively indicating a female element because in various embodiments the "optical receptacle" can be a male connector of an optical communications module. It should be further understood that the phrase "optical communications module" can refer to any module that includes one or more optoelectronic sub-assemblies, such as, for example, a receiver optical sub-assembly (ROSA), a transmitter optical sub-assembly (TOSA), or a transceiver optical sub-assembly.

When the optical communications module includes a transceiver optical sub-assembly, the transceiver optical sub-assembly can include an optoelectronic light source such as a laser, an optoelectronic light receiver such as a photodiode, and may further include electronic circuitry associated with the light source and the optoelectronic light receiver. For example, driver circuitry can be included for driving the laser, and receiver circuitry can be included for processing electrical signals produced by the photodiode. Optics such as lenses and reflectors may also be included in the sub-assembly in order to direct light emitted by the laser to an output receptacle of the sub-assembly or to direct light that is received at an input receptacle of the sub-assembly towards the photodiode contained inside the sub-assembly.

Attention is now drawn to FIG. 1, which shows an exemplary embodiment of an optical communications module 100 configured to accommodate a pair of connectors 106 and 107 that are provided at an end of a fiber optic cable 105. In accordance with this disclosure, the optical communications module 100 can be a small form-factor pluggable (SFP), an enhanced SFP (SFP+) optical communications module, or a Quad SFP (QSFP) optical communications module. However, the invention is not limited to these optical communications modules and can be implemented in various other optical communications modules. Furthermore, in this exemplary embodiment, the optical communications module 100 includes a pair of optical receptacles configured to accept a pair of connectors located at the end of a fiber optic cable. In other embodiments, the optical communications module 100 can include a single optical receptacle in order to provide connectivity to a single fiber optic cable or more than two optical receptacles in order to provide connectivity to more than two fiber optic cables.

The fiber optic cable assembly 105 shown in this exemplary embodiment includes a first connector 106 and a second connector 107, each of which has a form factor commonly referred to in the art as an "LC" (originally an abbreviation for Lucent Connector) form factor. In accordance with the LC form factor, each of the first connector 106 and the second connector 107 has a generally square profile that is insertable into a first optical port 120 and a second optical port 125 respectively of the optical communications module 100. Each of the first optical port 120 and the second optical port 125 of the optical communications module 100 has a corresponding square profile for receiving the first connector 106 and the second connector 107 respectively.

In accordance with the disclosure, a deformable constraining member (not shown) is used during assembly of the optical communications module 100 to ensure that each of the first optical receptacle 108 and the second optical receptacle 109 is precisely aligned with respect to the walls of the first optical port 120 and the second optical port 125 respectively. The deformable constraining member further constrains movement of the first optical receptacle 108 and the second optical receptacle 109 with respect to the walls of the first optical port 120 and the second optical port 125 respectively. As a result of this arrangement, precise optical alignment is automatically achieved between the two optical receptacles 108 and 109 of the optical communications module 100 and the two respective connectors 106 and 107 in the fiber optic cable assembly 105 when the fiber optic cable assembly 105 is coupled to the optical communications module 100. These aspects will be described below in more detail using other figures.

Figure 2:
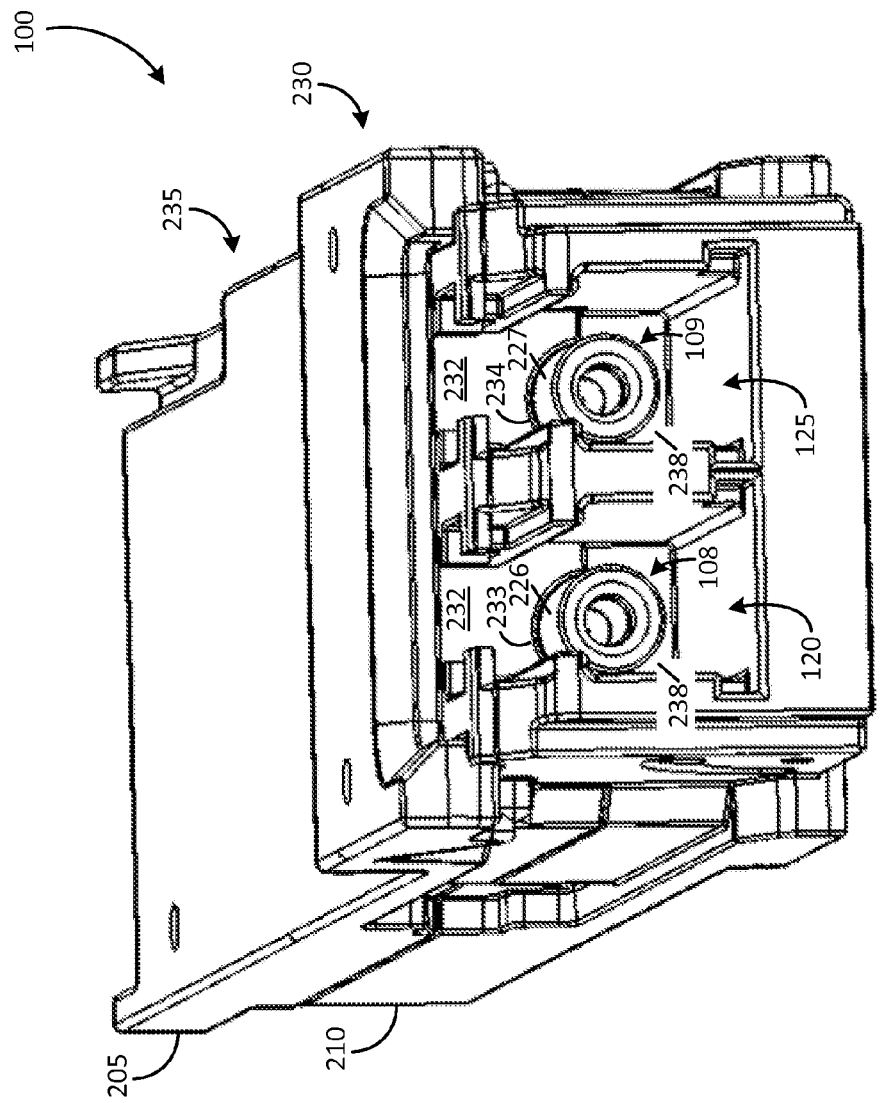
FIG. 2 shows a perspective external view of the optical communications module shown in FIG. 1.

FIG. 2 shows a perspective external view of the optical communications module 100. In accordance with this illustrative embodiment, the optical communications module 100 includes a front housing portion 230 coupled to a rear housing portion 235. The front housing portion 230 includes the first optical port 120 and the second optical port 125. The first optical port 120 provides room for connecting the first connector 106 of the optical cable 105 to the first optical receptacle 108. The second optical port 125 provides room for connecting the second connector 107 of the optical cable 105 to the second optical receptacle 109. The optical communications module 100 further includes an upper housing portion 205 and a lower housing portion 210. In one example implementation, each of the upper housing portion 205 and the lower housing portion 210 is made entirely, or in part, of a metal, although non-metallic materials may be used in other implementations. In a first exemplary embodiment, the upper housing portion 205 and the lower housing portion 210 can be provided in the form of a pivot and snap feature that allows the two portions to be mated with each together. In a second exemplary embodiment, the upper housing portion 205 and the lower housing portion 210 can be mated with each other using multiple screws (not shown).

A portion of each of the first optical receptacle 108 and the second optical receptacle 109 projects out via respective openings that have been provided for this purpose in the optical communications module 100. Specifically, a cylindrical body portion 226 of the first optical receptacle 108 projects out through a first opening and a cylindrical body portion 227 of the second optical receptacle 109 projects out through a second opening in the optical communications module 100. The first opening is formed by a combination of an alignment notch 233 that is provided in the front wall 232 of the upper housing portion 205 and a corresponding alignment notch (not shown) that is provided in a front wall 238 of the lower housing portion 210. The second opening is formed by a combination of another alignment notch 234 that is provided in the front wall 232 of the upper housing portion 205 and another corresponding alignment notch (not shown) that is provided in the front wall 238 of the lower housing portion 210. The various alignment notches will be described below in more detail with reference to other figures.

Figure 3:
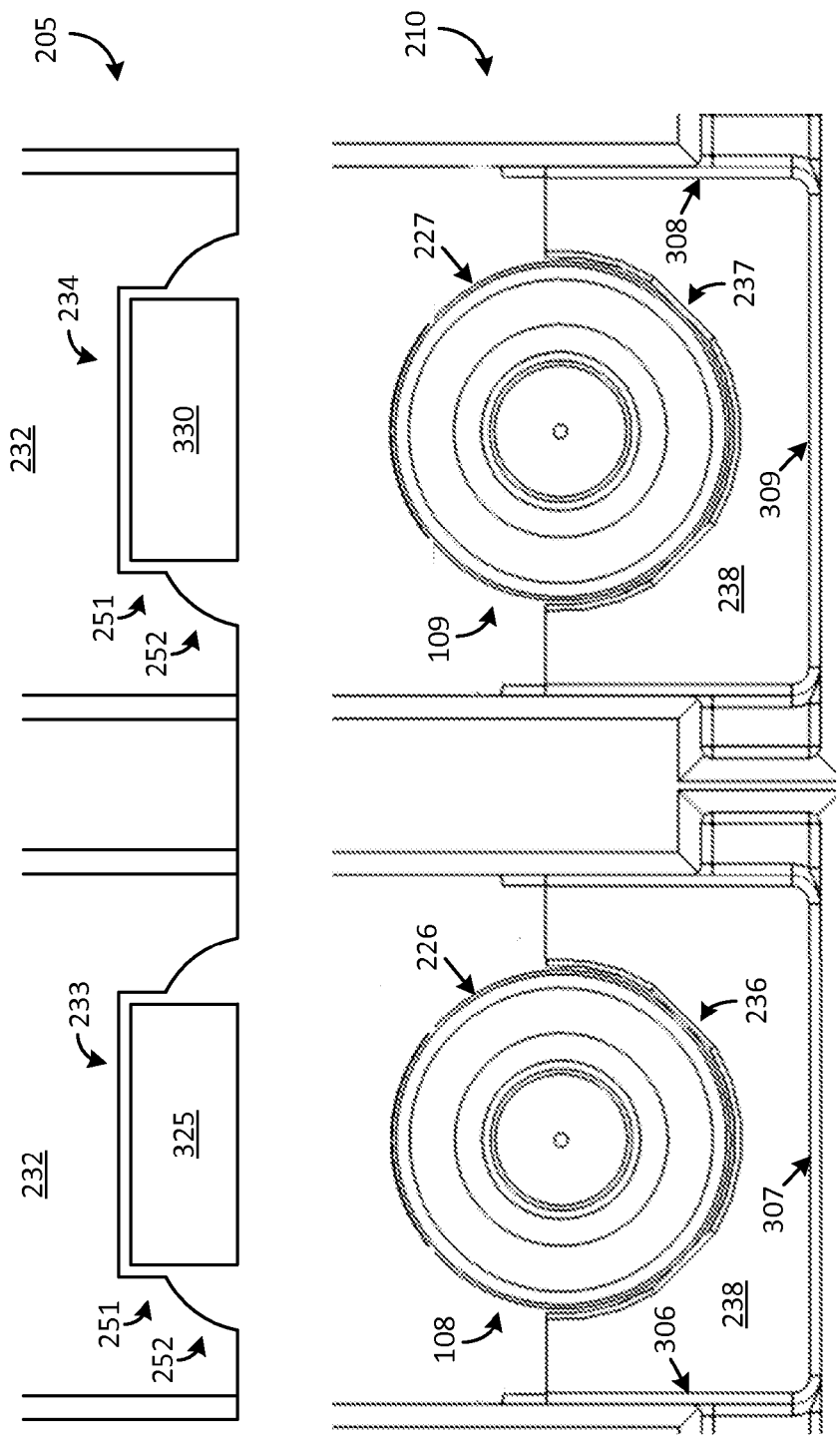
FIG. 3 shows a frontal view of a portion of an optical communications module, the frontal view showing a pair of deformable constraining members placed upon a pair of optical receptacles in accordance with one exemplary embodiment of the disclosure.

FIG. 3 shows an enlarged frontal view of the optical communications module 100 in accordance with one exemplary embodiment of the disclosure. This enlarged formal view corresponds to a preliminary condition wherein the front wall 232 of the upper housing portion 205 has not yet been mated with the front wall 238 of the lower housing portion 210 and prior to the start of an assembly procedure of the optical communications module 100. In this exemplary embodiment, the front wall 232 of the upper housing portion 205 includes the alignment notch 233 and the alignment notch 234. Each of the alignment notches 233 and 234 can have various shapes. In the exemplary embodiment shown in FIG. 3, each of the alignment notches 233 and 234 has a composite shape that combines a rectangular portion 251 with a curved portion 252. The rectangular portion 251 is configured to accommodate a deformable constraining member 325 as will be described below in more detail.

The front wall 238 of the lower housing portion 210 includes a corresponding alignment notch 236 and an alignment notch 237. In various exemplary implementations, each of the alignment notches 236 and 237 can have a U-shape, a V-shape, a semicircular shape, a composite shape, or a hybrid shape. These shapes will be described below in more detail using other figures.

When the front wall 232 of the upper housing portion 205 is mated with the front wall 238 of the lower housing portion 210, a combination of the alignment notch 233 and the alignment notch 236 constitutes the first opening through which projects the cylindrical portion 226 of the optical receptacle 108. Similarly, a combination of the semicircular alignment notch 234 and the alignment notch 237 constitutes the second opening through which projects the cylindrical portion 227 of the optical receptacle 109.

Typically, each of the upper housing portion 205 and the lower housing portion 210 is fabricated using a molding process, whereby each of the alignment notches 233, 234, 236 and 237 is automatically aligned to a precision tolerance with respect to one or more surfaces of the first optical port 120 and the second optical port 125. For example, the alignment notch 236 is automatically aligned with a sidewall 306 and a bottom surface 307 of the first optical port 120, and the alignment notch 237 is automatically aligned with a sidewall 308 and a bottom surface 309 of the second optical port 125.

The first deformable constraining member 325 can be accommodated in the rectangular portion 251 of the alignment notch 233 and in vertical alignment with a top surface of the cylindrical body portion 226 of the first optical receptacle 108. Particulars pertaining to accommodating the first deformable constraining member 325 in the rectangular portion 251 are provided below with reference to other figures. A second deformable constraining member 330 can be similarly accommodated in the rectangular portion 251 of the alignment notch 234 and in vertical alignment with a top surface of the cylindrical body portion 227 of the second optical receptacle 109.

When the upper housing portion 205 is mated with the lower housing portion 210, such as, for example, by employing a pivot and snap feature when assembling the optical communications module 100, the first deformable constraining member 325 is pressed downwards and makes contact with the top surface of the cylindrical body portion 226 of the first optical receptacle 108. At the same time, the second deformable constraining member 330 makes contact with the top surface of the cylindrical body portion 227 of the second optical receptacle 109. When pressure is further applied to secure the mating of the upper housing portion 205 with the lower housing portion 210, such as, for example, by operating one or more screws (not shown) that are included in one or both of the upper housing portion 205 and the lower housing portion 210, the rectangular portion 251 of the alignment notch 233 compresses the first deformable constraining member 325 causing it to deform and furthermore, to push the optical receptacle 108 into the alignment notch 236. The rectangular portion 251 of the alignment notch 234 similarly compresses the second deformable constraining member 330 causing it to deform and furthermore, pushes the optical receptacle 109 into the alignment notch 237.

Figure 4:
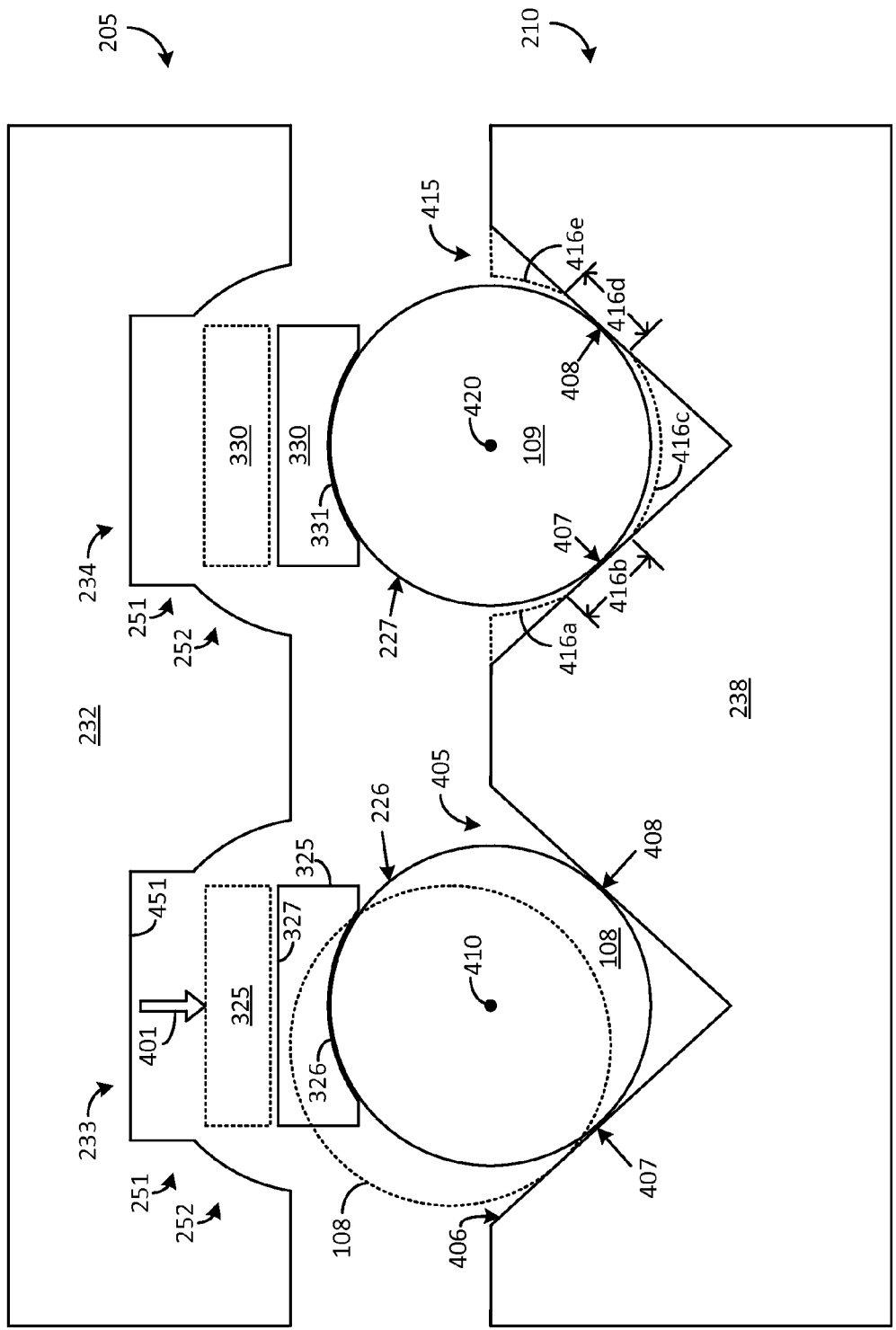
FIG. 4 shows a profile drawing of a portion of an optical communications module, the profile drawing showing a pair of deformable constraining members placed upon a pair of optical receptacles in accordance with another exemplary embodiment of the disclosure.

FIG. 4 shows a profile drawing of a portion of the optical communications module 100 in accordance with another exemplary embodiment of the disclosure. Unlike the exemplary embodiment described above with reference to FIG. 3 wherein each of the alignment notch 236 and the alignment notch 237 in the lower housing portion 210 is a substantially U-shaped, in this exemplary embodiment, the lower housing portion 210 includes a first V-shaped alignment notch 405 and a second V-shaped alignment notch 415.

The V-shaped alignment notch 405 facilitates automatic alignment of the optical receptacle 108 with a first longitudinal optical axis 410 of the optical communications module 100. It is highly desirable that the first longitudinal optical axis 410 of the optical communications module 100 be automatically and precisely aligned with a light propagating axis of the first connector 106 that is shown in FIG. 1. The V-shaped alignment notch 415 similarly facilitates automatic alignment of the optical receptacle 109 with a second longitudinal optical axis 420 of the optical communications module 100. It is highly desirable that the second longitudinal optical axis 420 of the optical communications module 100 be automatically and precisely aligned with a light propagating axis of the second connector 107 that is shown in FIG. 1.

The description below is made with reference to the first deformable constraining member 325. However, it should be understood that the description applies equally well to the second deformable constraining member 330.

Attention is first drawn to a dashed line outline of the first deformable constraining member 325 that is indicative of a shape of the first deformable constraining member 325 during a preliminary condition wherein the front wall 232 of the upper housing portion 205 has not yet been mated with the front wall 238 of the lower housing portion 210, (such as, for example, prior to using the pivot and snap feature for assembling the optical communications module 100).

A dashed line outline of the cylindrical body portion 226 of the first optical receptacle 108 is also shown to indicate one possible position in which the cylindrical body portion 226 can be located as a result of say, a manual placement action carried out upon the optical receptacle 108 during the start of the assembly procedure of the optical communications module 100.

As mentioned above, the assembly procedure can be executed in various ways such as, for example, by employing a pivot and snap feature to mate the upper housing portion 205 with the lower housing portion 210 and/or by operating one or more screws (not shown) that leads to pressurized contact between the upper housing portion 205 and the lower housing portion 210. During the assembly procedure, the rectangular portion 251 of the alignment notch 233 applies compression force upon the first deformable constraining member 325 (as indicated by the arrow 401). The first deformable constraining member 325 in turn makes contact with an upper surface of the cylindrical body portion 226 of the first optical receptacle 108 and pushes the first optical receptacle 108 downwards into the V-shaped alignment notch 405.

During this process, an automatic alignment action occurs as a result of the sloping side 406 of the V-shaped alignment notch 405 causing the cylindrical body portion 226 to slide downwards such that the cylindrical body portion 226 eventually rests against two contact points 407 and 408 of the V-shaped alignment notch 405. The dimensions and shape of the V-shaped alignment notch 405 is explicitly tailored with reference to a diameter of the cylindrical body portion 226 such that the cylindrical body portion 226 is automatically aligned with the optical axis 410.

It should be understood that the dimensions and shapes of variously shaped alignment notches referred to elsewhere in this disclosure are also explicitly tailored with reference to the diameter of the cylindrical body portion 227 such that the cylindrical body portion 226 is automatically aligned with the optical axis 410 and eventually rests against two contact points that are similar to the two contact points 407 and 408 of the V-shaped alignment notch 405.

Now referring back to the V-shaped alignment notch 405, upon completion of the assembly procedure, the first optical receptacle 108 automatically becomes precisely aligned with respect to the various walls and surfaces of the first optical port 120 (shown in FIG. 1). This precise alignment allows the square profile of the first connector 106 of the fiber optic cable assembly 105 (shown in FIG. 1) to establish a snug fit inside the first optical port 120 and minimize, if not eliminate, wiggling of the first connector 106 in the first optical port 120.

Attention is next drawn to the first deformable constraining member 325 in order to describe certain features of the first deformable constraining member 325. It should be understood that this description is equally applicable to the second deformable constraining member 330. Each of the first deformable constraining member 325 and the second deformable constraining member 330 is made of malleable material such as, for example, a malleable plastic or a soft metal alloy. The malleable material has certain properties pertaining to transitioning from an elastic regime to a plastic regime. Specifically, the malleable material selected for implementing the first deformable constraining member 325 and the second deformable constraining member 330 in accordance with the disclosure, transitions from an elastic regime to a plastic regime when subjected to a certain amount of compression force for effecting a deformation. A transition from an elastic regime to a plastic regime can be generally characterized by one of several parameters that is known in the art as Young's modulus. The malleable material in accordance with the disclosure has a Young's modulus that is higher than the Young's modulus of an "elastic" material such as rubber (0.01 to 0.1 GPa) and lower than the Young's modulus of a "stiff" material such as, for example, steel (180-200 GPa). Accordingly, in various embodiments in accordance with the disclosure, each of the first deformable constraining member 325 and the second deformable constraining member 330 can be made of a material that has a Young's modulus range extending from about 0.5 GPa to about 100 GPa, which includes various plastics as well as various soft metal alloys such as aluminum, for example. However, it will be pertinent to point out that this range explicitly precludes rubber.

Drawing attention back to FIG. 4, the dashed line outline of the first deformable constraining member 325 indicates a shape of the first deformable constraining member 325 prior to compression pressure being applied upon the first deformable constraining member 325 by the rectangular portion 251 of the alignment notch 233. Upon application of compression pressure, the first deformable constraining member 325 deforms to an initial deformed shape that can be characterized by a bottom surface 326 of the first deformable constraining member 325 conforming to the shape of a portion of the upper surface of the cylindrical body portion 226 of the first optical receptacle 108. At this time, a ceiling portion 451 of the rectangular portion 251 is in contact with, and pressing down upon, a top surface 327 of the first deformable constraining member 325, thereby forcing the first deformable constraining member 325 to retain the initial deformed state.

The initial deformed state of the first deformable constraining member 325 automatically urges the first optical receptacle 108 to be seated in the V-shaped alignment notch 405 and prevents wiggling of the cylindrical portion 226 of the optical receptacle 108, thereby constraining movement of some or all portions of the first optical receptacle 108 inside the optical communications module 100. More particularly, the first deformable constraining member 325 prevents lateral movement (upwards, downwards, or sideways) of the cylindrical portion 226 of the optical receptacle 108. The second deformable constraining member 330, which has been deformed by the rectangular portion 251 of the alignment notch 234, similarly prevents lateral movement (upwards, downwards, or sideways) of the cylindrical portion 227 of the optical receptacle 109.

The initial deformed state of the first deformable constraining member 325 can be retained during normal use and operation of the optical communications module 100. However, if it is desired to disassemble the optical communications module 100 at a later instant in time, such as, for example, by operating one or more screws to decouple the upper housing portion 205 from the lower housing portion 210, the compression pressure applied upon the first deformable constraining member 325 by the rectangular portion 251 gets automatically removed as a result of the decoupling operation. When the compression force is removed, each of the first deformable constraining member 325 and the second deformable constraining member 330 is transformed to a free-standing deformed state. However, unlike a rubber compound, the material of the first deformable constraining member 325 is selected to explicitly prevent the first deformable constraining member 325, when in the free-standing deformed state, from reverting to the original shape shown by the dashed line outline.

Furthermore, upon a partial removal of the compression pressure, for example, as a result of an intentional or accidental partial separation of the upper housing portion 205 from the lower housing portion 210, the initial deformed state of the first deformable constraining member 325 changes to an intermediate deformed state. The intermediate deformed state is characterized by the top surface 327 of the first deformable constraining member 325 resiliently bulging upwards and maintaining pressurized contact with the ceiling portion 451 of the alignment notch 233. The pressurized contact provided by the intermediate deformed state of the first deformable constraining member 325 thus restricts movement of some or all portions of the first optical receptacle 108 inside the optical communications module 100 even when the upper housing portion 205 is partially separated from the lower housing portion 210. An intermediate deformed state of the second deformable constraining member 330 similarly restricts movement of some or all portions of the second optical receptacle 109 inside the optical communications module 100.

In the exemplary embodiment shown in FIG. 4, each of the two alignment notches 405 and 415 provided in the front wall 238 of the lower housing portion 210 has a V-shape. However, in other embodiments, a hybrid V-shape that incorporates a linear portion can be used. To elaborate upon this aspect, attention is drawn to the V-shaped alignment notch 415, which further shows a dashed line outline of a hybrid notch 416 having segments that are indicated by reference designators 416a through 416e. The segments 416a, 416c, and 416e correspond to segments of a U shape, while the segments 416b and 416d are linear segments. The location of the linear segment 416b is explicitly selected to encompass the contact point 407 where the cylindrical body portion 227 of the second optical receptacle 109 makes contact with the hybrid notch 416 and the location of the linear segment 416d is explicitly selected to encompass the contact point 408 where the cylindrical body portion 227 of the second optical receptacle 109 makes another contact with the hybrid notch 416.

The segments 416a, 416c, and 416e of the U-shape can provide benefits such as, for example, minimizing emission of electromagnetic energy from inside the optical communications module 100. It will be understood that the first V-shaped alignment notch 405 can be similarly replaced by a hybrid notch that is similar to the hybrid notch 416.

Figure 5:
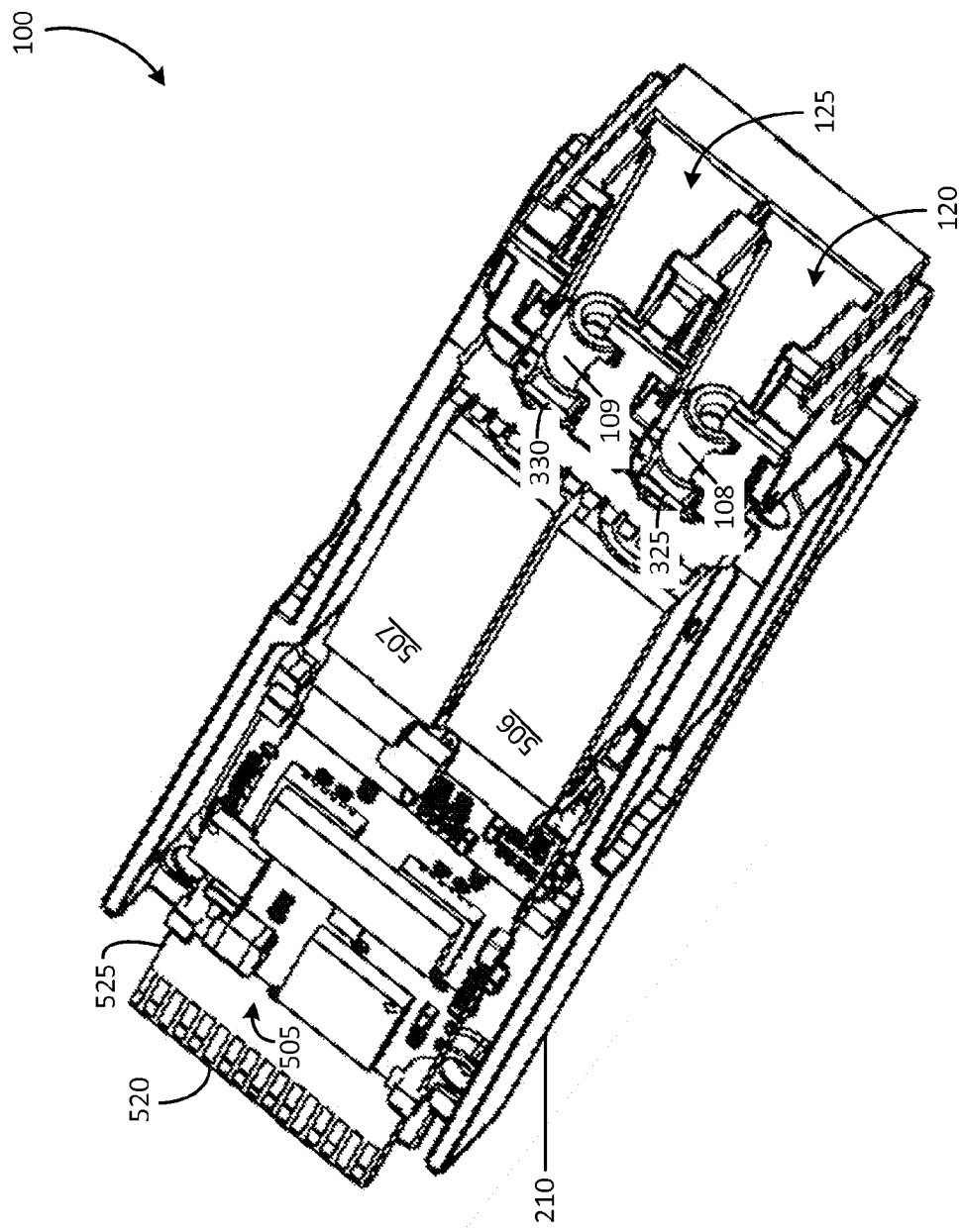
FIG. 5 shows a perspective view of various exemplary components mounted in a lower housing portion of an optical communications module in accordance with the disclosure.

Attention is now drawn to FIG. 5, which shows a perspective view of various exemplary components mounted in the lower housing portion 210 of the optical communications module 100. The various exemplary components include an electronic circuit assembly 505, a first optoelectronic sub-assembly 506, and a second optoelectronic sub-assembly 207. The electronic circuit assembly 505 includes various components that operate upon electrical signals that can be provided to, or received from, one or both of the first optoelectronic sub-assembly 506 and the second optoelectronic sub-assembly 207.

Each of the first optoelectronic sub-assembly 506 and the second optoelectronic sub-assembly 507 performs operations that include signal conversion between the optical domain and the electrical domain. For example, when the optical communications module 100 is configured to transmit optical signals out of the first optical receptacle 108, the first optoelectronic sub-assembly 506 can convert electrical signals received from the electronic circuit assembly 505 into optical signals that are propagated out of the first optical receptacle 108. On the other hand, when the optical communications module 100 is configured to receive an optical signal via the first optical receptacle 108, the first optoelectronic sub-assembly 506 can convert the received optical signals into electrical signals that are then provided to the electronic circuit assembly 505.

In this exemplary embodiment, the various components of the electronic circuit assembly 505 are mounted on a printed circuit board (PCB) 525. The PCB 525 can be a multilayer PCB and include a ground layer. The ground layer is connected to a set of ground contacts that are a part of an edge connector 520. The edge connector 520 has other contacts that are connected to various other components of the electronic circuit assembly 505 for purposes of conducting various electrical signals that are operated upon by the electronic circuit assembly 505. Such signals include power signals that are used to power the various components of the electronic circuit assembly 505.

When the optical communications module 100 is inserted into a host device (not shown) such as a router or a communications switch, the edge connector 520 mates with a corresponding connector in the host device. Each of the contacts in the edge connector 520 makes contact with a matching set of contacts in the corresponding connector of the host device.

Each of the first optoelectronic sub-assembly 506 and the second optoelectronic sub-assembly 507 is typically implemented in the form of a metal enclosure. The first optical receptacle 108 and the second optical receptacle 109 are each mounted on a respective wall of the first optoelectronic sub-assembly 506 and the second optoelectronic sub-assembly 507. Thus, the cylindrical body portion of each of the first optical receptacle 108 and the second optical receptacle 109 project into the first optical port 120 and the second optical port 125 respectively of the communications module 100. The first deformable constraining element 325 is mounted on the cylindrical body portion of the first optical receptacle 108 and the second deformable constraining element 330 is mounted on the cylindrical body portion of the second optical receptacle 109 in accordance with the disclosure.

Figure 6:
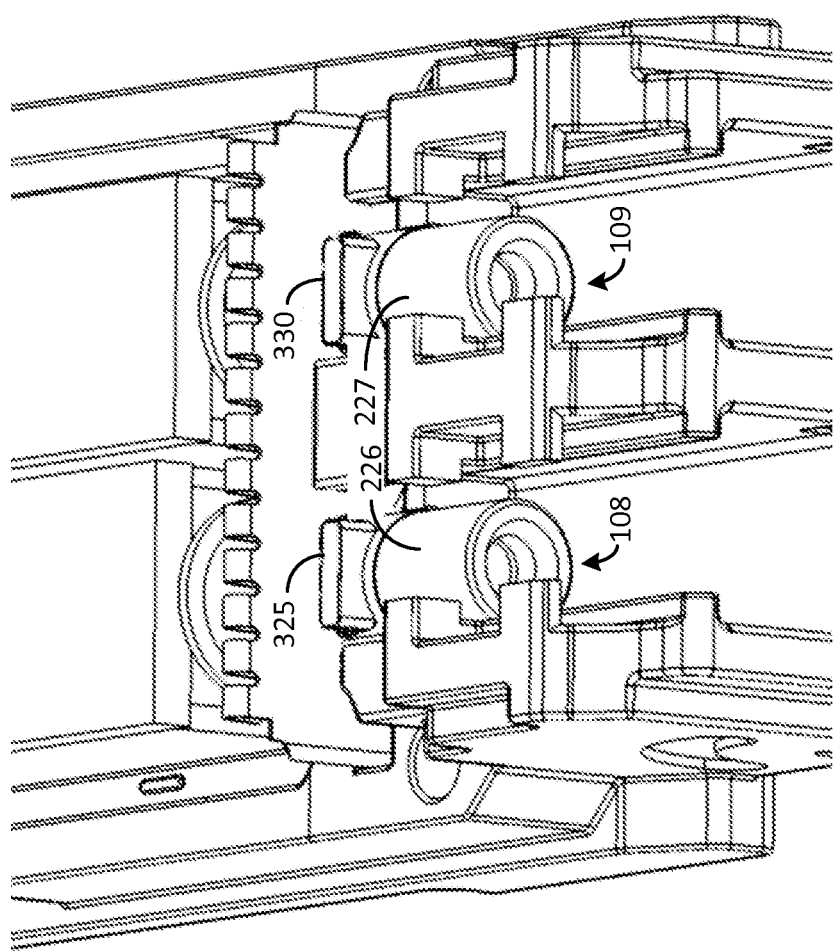
FIG. 6 shows a close-up perspective view of a portion of the optical communications module that incorporates a pair of deformable constraining elements in accordance with the disclosure.

FIG. 6 shows a close-up perspective view of a portion of the optical communications module 100 that incorporates the first deformable constraining element 325 placed in contact with the cylindrical body portion 226 of the first optical receptacle 108 and the second deformable constraining element 330 placed in contact with the cylindrical body portion 227 of the second optical receptacle 109 in accordance with the disclosure. The placement of each of the first deformable constraining element 325 and the second deformable constraining element 330 can be executed in various ways.

In one exemplary implementation, each of the first deformable constraining element 325 and the second deformable constraining element 330 can be manually placed upon the respective the cylindrical body portions 226 and 227 prior to mating of the upper housing portion 205 with the lower housing portion 210.

Figure 7:
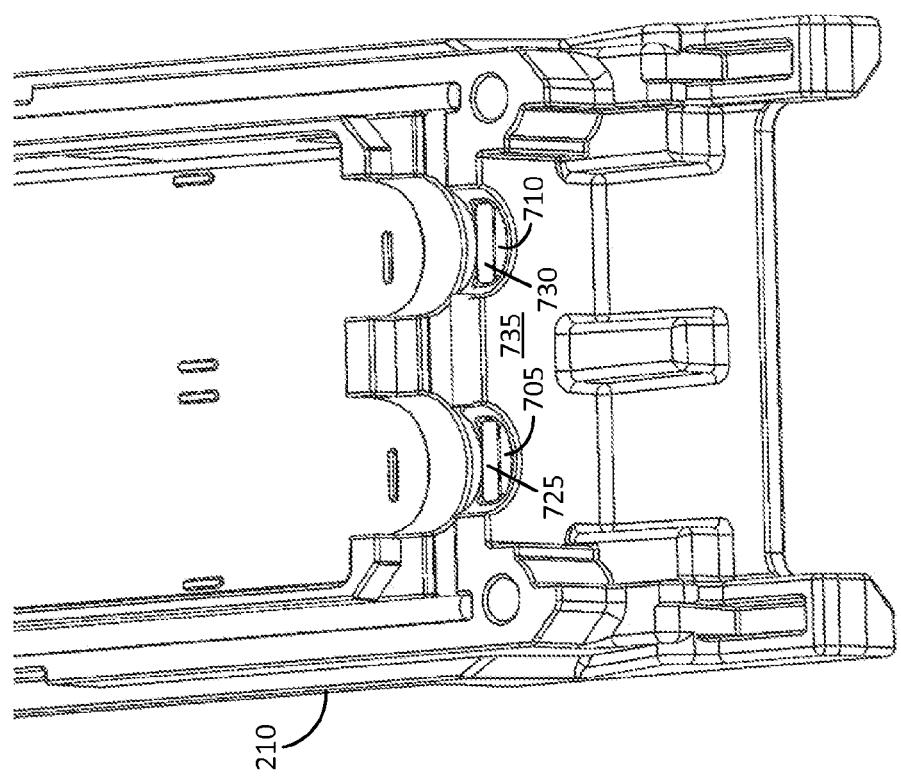
FIG. 7 shows an inside view of an exemplary upper housing portion of an optical communications module, the upper housing portion configured to anchor a pair of deformable constraining elements in accordance with the disclosure.

However, another exemplary implementation is illustrated in FIG. 7, which shows an inside view of an exemplary upper housing portion 205 configured to anchor each of a first deformable constraining element 725 and a second deformable constraining element 730 in accordance with the disclosure. More particularly, in this exemplary implementation, the first deformable constraining element 725 is anchored inside a first recess 705 and the second deformable constraining element 730 is anchored inside a second recess 710. The first recess 705 and the second recess 710 can be located in a bottom edge of a front wall 735 of the upper housing portion 205.

The anchoring of the first deformable constraining element 725 inside the first recess 705 and the second deformable constraining element 730 inside the second recess 710 can be executed in various alternative ways, such as, for example, by using one or more clasps; by using one or more protrusions or indentations in each recess; by using one or more tabs or recesses in each deformable constraining element; by using surface roughness that provides frictional contact; or by using epoxy to hold the deformable element in place.

Figure 8:
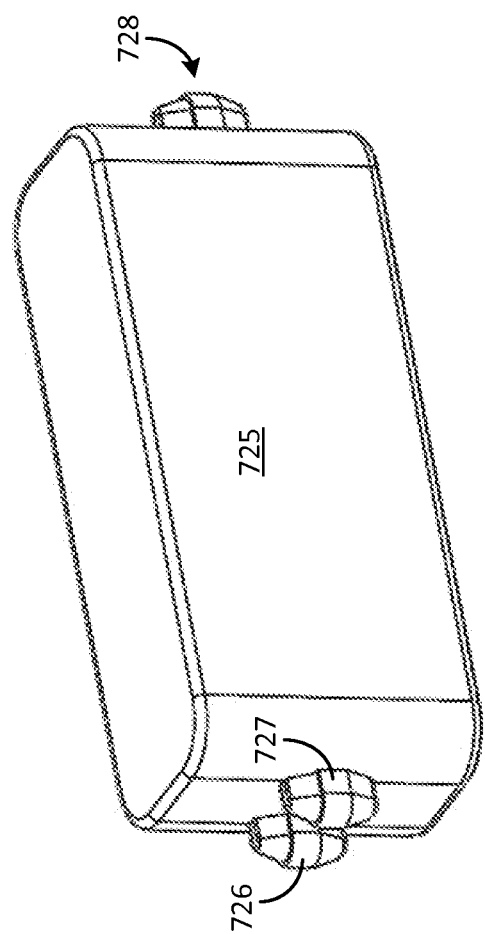
FIG. 8 shows an exemplary embodiment of a deformable constraining element incorporating anchoring elements for anchoring the deformable constraining element inside a recess of an upper housing portion of an optical communications module in accordance with the disclosure.

FIG. 8 shows an exemplary embodiment of the deformable constraining element 725 incorporating anchoring elements for anchoring the deformable constraining element inside a recess in accordance with the disclosure. The features indicated with respect to the first deformable constraining element 725 can be identical to features that are provided in the second deformable constraining element 730 as well.

Viewing FIG. 8 in conjunction with FIG. 7, it can be understood that the first deformable constraining element 725 is a rectangular element having a longer side aligned substantially parallel to the front wall 735 of the upper housing portion 205. Because the front wall 735 of the upper housing portion 205 is coplanar to the front wall 238 of the lower housing portion 210 (shown in FIG. 2), the longer side of the first deformable constraining element 725 is also aligned substantially parallel to the front wall 238 of the lower housing portion 210.

The exemplary first deformable constraining element 725 includes a first protrusion 726 and an adjacent second protrusion 726 on a side surface of the first deformable constraining element 725. In this exemplary implementation, each of the first protrusion 726 and the second protrusion 726 is provided in the form of a tab. A similar (or identical) pair of protrusions 728 can be provided on an opposing side surface of the first deformable constraining element 725. Each protrusion provides a friction fit when the first deformable constraining element 725 is press-fitted into the first recess 705 of the upper housing portion 205 because the protrusions 726 and 727 can plastically deform to fill the available width of the recess and provide the requisite friction fit. The first recess 705 can also incorporate other features that provide a retention force upon the first deformable constraining element 725.

The friction fit advantageously allows the internal portion of the upper housing portion 205 to face downwards during mating with the lower housing portion 210, without having the first deformable constraining element 725 (and the second deformable constraining element 730) fall out of their respective recesses. The first recess 705 and the second recess 710 are aligned with respect to the lower housing portion 210 such that the first deformable constraining element 725 automatically comes in contact with the upper surface of the cylindrical body portion 226 of the first optical receptacle 108, and the second deformable constraining element 730 automatically comes in contact with the upper surface of the cylindrical body portion 227 of the first optical receptacle 109, when the upper housing portion 205 is mated with the lower housing portion 210.

In alternative embodiments, a single protrusion can be used in place of multiple protrusions; one or more protrusions can be located on various surfaces other than, or in addition to, the side surfaces of the first deformable constraining element 725; and various shapes can be used for the protrusions such as, for example, a bulb shape, a strip shape, or a cylinder shape.

In summary, it should be noted that the invention has been described with reference to a few illustrative embodiments for the purpose of demonstrating the principles and concepts of the invention. It will be understood by persons of skill in the art, in view of the description provided herein, that the invention is not limited to these illustrative embodiments. Persons of skill in the art will understand that many such variations can be made to the illustrative embodiments without deviating from the scope of the invention.

What is claimed is:

1. An optical communications module, comprising:
   an electro-optical assembly that includes an optical receptacle, the optical receptacle comprising a cylindrical connector portion;
   a deformable constraining member made of one of a malleable plastic or a soft metal alloy, the one of a malleable plastic or a soft metal alloy characterized by: a) a transition from an elastic regime to a plastic regime when subjected to a compression force for effecting a deformation, and b) upon subsequent removal of at least a portion of the compression force, when in the plastic regime, a reversal of at least a portion of the elastic regime; and
   a housing that accommodates the optical receptacle, the housing comprising a lower housing portion that is detachably mated with an upper housing portion, the lower housing portion including an alignment notch that automatically aligns the cylindrical connector portion of the optical receptacle with an optical axis of the optical communications module when the cylindrical connector portion of the optical receptacle is pressed into the alignment notch by applying the compression force against the deformable constraining member during mating of the upper housing portion with the lower housing portion, the compression force directed at transforming the deformable constraining member into a contoured constraining member having a contour portion that conforms to at least a part of the cylindrical connector portion of the optical receptacle and prevents wiggling of the cylindrical connector portion of the optical receptacle after placement in the alignment notch.

2. The optical communications module of claim 1, wherein the alignment notch is one of a V-shaped alignment notch, a U-shaped alignment notch, a composite alignment notch, or a hybrid alignment notch.

3. The optical communications module of claim 1, wherein the one of a malleable plastic or a soft metal alloy has a Young's modulus extending from about 0.5 Gigapascal (GPa) to about 100 GPa.

4. The optical communications module of claim 3, wherein the deformable constraining member is anchored upon a top surface of the cylindrical connector portion of the optical receptacle.

5. The optical communications module of claim 4, wherein the alignment notch is a part of a wall of the lower housing portion and the compression force is applied against the deformable constraining member by a section of the upper housing portion.

6. The optical communications module of claim 5, wherein the deformable constraining member is a rectangular element having a longer side aligned substantially parallel to the wall of the lower housing portion.

7. The optical communications module of claim 3, wherein the deformable constraining member is anchored to a bottom edge of a wall of the upper housing portion such that the deformable constraining member makes contact with the cylindrical connector portion of the optical receptacle when the compression force is applied against the deformable constraining member by the bottom edge of the wall during mating of the upper housing portion with the lower housing portion.

8. The optical communications module of claim 7, comprising one or more clasps for anchoring the deformable constraining member to the bottom edge of the wall of the upper housing portion.

9. The optical communications module of claim 7, wherein the deformable constraining member is anchored to the bottom edge of the wall of the upper housing portion by use of at least one of an adhesive or an adhesive carrier element.

10. The optical communications module of claim 9, wherein the adhesive carrier element is an adhesive tape.

11. An optical communications module, comprising:
    a housing that accommodates an optical receptacle having a cylindrical connector portion, the housing comprising:
        an upper housing portion;
        a lower housing portion that includes a front wall having an alignment notch configured for aligning the cylindrical connector portion of the optical receptacle with an optical axis of the optical communications module when the cylindrical connector portion of the optical receptacle is pushed into the alignment notch during mating of the lower housing portion with the upper housing portion; and
        a constraining member having a contoured shape that prevents wiggling of the cylindrical connector portion of the optical receptacle after placement of the cylindrical connector in the alignment notch, the contoured shape formed by application of a compression force upon the constraining member during mating of the upper housing portion with the lower housing portion, the constraining member made of a material having a Young's modulus that is greater than 0.5 Gigapascal (GPa) and less than about 100 GPa.

12. The optical communications module of claim 11, wherein the alignment notch is one of a V-shaped alignment notch, a U-shaped alignment notch, a composite alignment notch, or a hybrid alignment notch.

13. The optical communications module of claim 12, wherein the material of the constraining member is one of a malleable plastic or a soft metal alloy.

14. The optical communications module of claim 13, wherein the constraining member is anchored upon a top surface of the cylindrical connector portion of the optical receptacle.

15. The optical communications module of claim 13, wherein the constraining member is anchored upon a surface of the cylindrical connector portion of the optical receptacle that is not in contact with the alignment notch.

16. The optical communications module of claim 13, wherein the constraining member is anchored to a bottom edge of the upper housing portion such that the constraining member makes contact with the cylindrical connector portion of the optical receptacle when the compression force is applied against the constraining member by the bottom edge of the upper housing portion during mating of the upper housing portion with the lower housing portion.

17. An optical communications module, comprising:
a first optical receptacle comprising a first cylindrical connector portion;
a second optical receptacle comprising a second cylindrical connector portion;
a first constraining member made of a material having a Young's modulus that is greater than 0.5 Gigapascal (GPa) and less than about 100 GPa;
a second constraining member made of the material having a Young's modulus that is greater than 0.5 Gigapascal (GPa) and less than about 100 GPa; and
a housing that accommodates the first optical receptacle and the second optical receptacle, the housing comprising a lower housing portion that is detachably mated with an upper housing portion, the lower housing portion including a first alignment notch that automatically aligns the cylindrical connector portion of the first optical receptacle with a first optical axis of the optical communications module when the cylindrical connector portion of the first optical receptacle is pressed into the first alignment notch by applying the compression force against the first constraining member during mating of the upper housing portion with the lower housing portion, the compression force directed at transforming the first constraining member into having a first contoured shape that conforms to at least a portion of the cylindrical connector portion of the first optical receptacle and prevents wiggling of at least the cylindrical connector portion of the first optical receptacle after placement in the first alignment notch, the lower housing portion further including a second alignment notch that automatically aligns the cylindrical connector portion of the second optical receptacle with a second optical axis of the optical communications module when the cylindrical connector portion of the second optical receptacle is pressed into the second alignment notch by applying the compression force against the second constraining member during mating of the upper housing portion with the lower housing portion, the compression force directed at transforming the second constraining member into having a second contoured shape that conforms to at least a portion of the cylindrical connector portion of the second optical receptacle and prevents wiggling of at least the cylindrical connector portion of the second optical receptacle after placement in the second alignment notch.

18. The optical communications module of claim 17, wherein one or both of the first alignment notch and the second alignment notch is one of a V-shaped alignment notch, a U-shaped alignment notch, a composite alignment notch, or a hybrid alignment notch.

19. The optical communications module of claim 17, wherein each of the first optical receptacle and the second optical receptacle are located adjacent to each other.

20. The optical communications module of claim 17, wherein each of the first alignment notch and the second alignment notch is located in a wall of the lower housing portion and the compression force is applied against each of the first constraining member and the second constraining member by an edge portion of a wall of the upper housing portion during mating of the upper housing portion with the lower housing portion.

* * * * *